United States Patent [19]

Arikawa et al.

[11] Patent Number: 5,546,810
[45] Date of Patent: Aug. 20, 1996

[54] PRESSURE MEASURING DEVICE AND METHOD USING QUARTZ RESONATORS

[75] Inventors: Yasuo Arikawa; Eiichi Miyazawa, both of Suwa, Japan

[73] Assignee: Seiko Epson Corporation, Japan

[21] Appl. No.: 367,330

[22] PCT Filed: Jul. 4, 1994

[86] PCT No.: PCT/JP94/01086

§ 371 Date: May 3, 1995

§ 102(e) Date: May 3, 1995

[87] PCT Pub. No.: WO95/02173

PCT Pub. Date: Jan. 19, 1995

[30] Foreign Application Priority Data

Jul. 6, 1993 [JP] Japan .................................. 5-167127
Jan. 31, 1994 [JP] Japan .................................. 6-009535

[51] Int. Cl.$^6$ .................................. G01L 11/00; G01L 1/10
[52] U.S. Cl. .................................. 73/702; 73/862.59
[58] Field of Search .................................. 73/702, 708, 714, 73/862.59, 862.68; 310/338; 331/65; 374/143

[56] References Cited

U.S. PATENT DOCUMENTS

| | | | |
|---|---|---|---|
| 4,644,804 | 2/1987 | Ramm et al. .................... | 73/862.59 |
| 5,136,885 | 8/1992 | Liebermann et al. ............ | 73/702 |
| 5,165,289 | 11/1992 | Tilmans .......................... | 73/862.59 |
| 5,231,880 | 8/1993 | Ward et al. ..................... | 73/702 |

FOREIGN PATENT DOCUMENTS

| | | |
|---|---|---|
| 51-92665 | 8/1976 | Japan . |
| 54-158275 | 12/1979 | Japan . |
| 57-12342 | 1/1982 | Japan . |
| 59-67437 | 4/1984 | Japan . |
| 3-189528 | 8/1991 | Japan . |
| 3-243840 | 10/1991 | Japan . |
| 3-248028 | 11/1991 | Japan . |

*Primary Examiner*—Richard Chilcot
*Assistant Examiner*—William L. Oen
*Attorney, Agent, or Firm*—Harold T. Tsiang

[57] ABSTRACT

The temperature dependence of the difference in oscillation frequency between two quartz resonators caused by the pressure difference between the two quartz resonators as well as the intrinsic physical properties between them can be compensated accurately and at low cost by calibrating the difference in oscillation frequency between the two quartz resonators by means of a quadratic formula with regard to temperature or by reducing the temperature dependence of the difference in oscillation frequency by connecting a thermistor to oscillation circuits. Pulses from each of an oscillation circuit (1) including a quartz resonator placed in vacuum and another oscillation circuit (2) including a quartz resonator placed in an atmospheric pressure are counted by pulse counters (3, 4). The difference between the pulse counts is obtained by a subtracter (5) and sent out to an MPU (6) as a measured value. A temperature sensor (7) measures the ambient temperature of both the quartz resonators and outputs it to MPU (6) through an AD converter (8). MPU (6) determines a quadratic temperature calibration formula with regard to temperature using the input temperature data and the calibration parameters stored in a ROM (9) and calibrates the measured value using the formula.

22 Claims, 10 Drawing Sheets

DISTRIBUTION OF TURNING POINTS
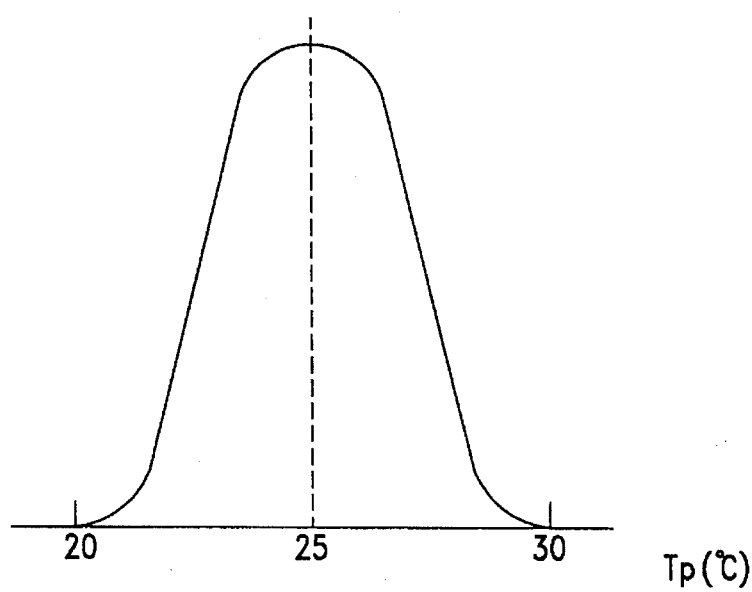
FIG.−6
DISTRIBUTION OF SECOND ORDER TEMPERATURE COEFFICIENTS
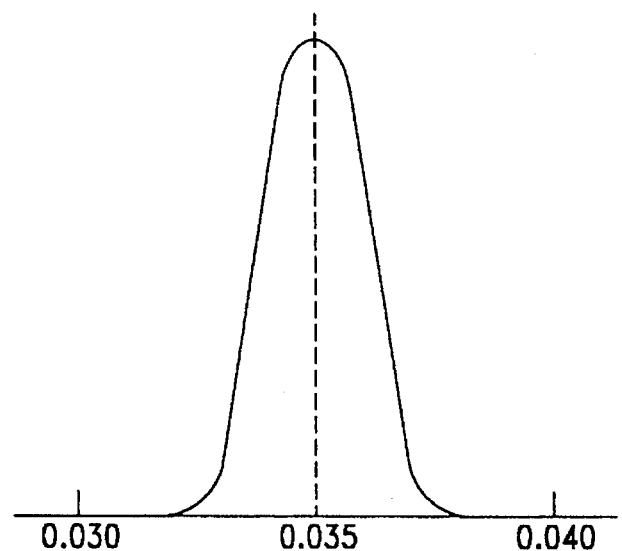
FIG.−7

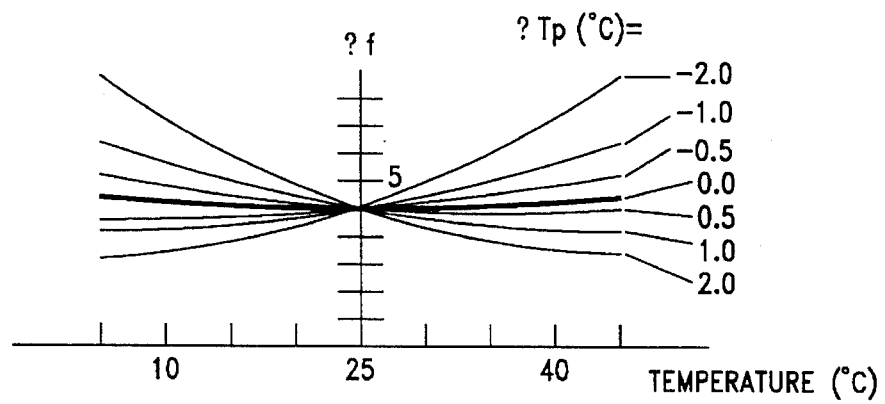
FIG.-8
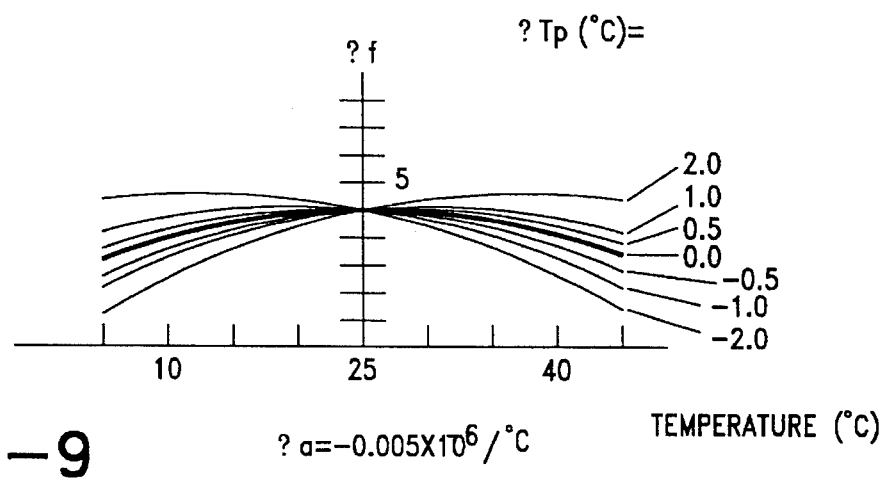
FIG.-9
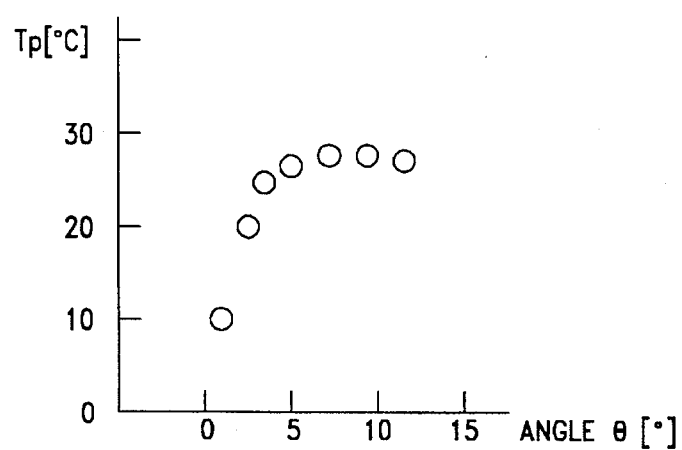
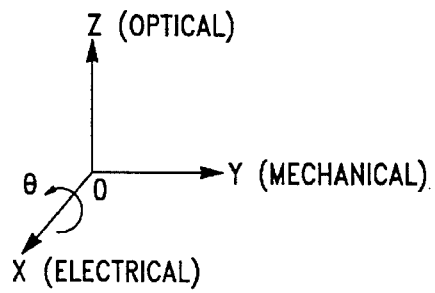
FIG.-10

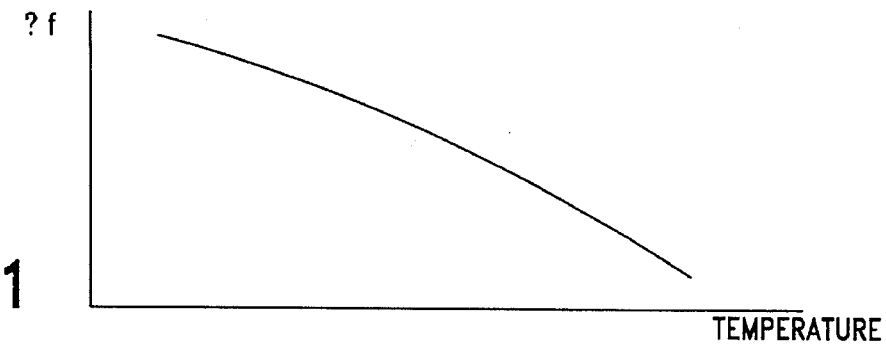
FIG.-11
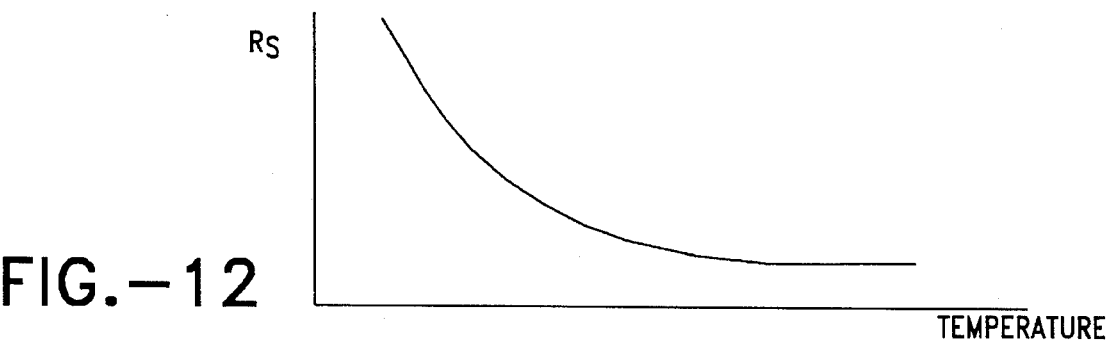
FIG.-12
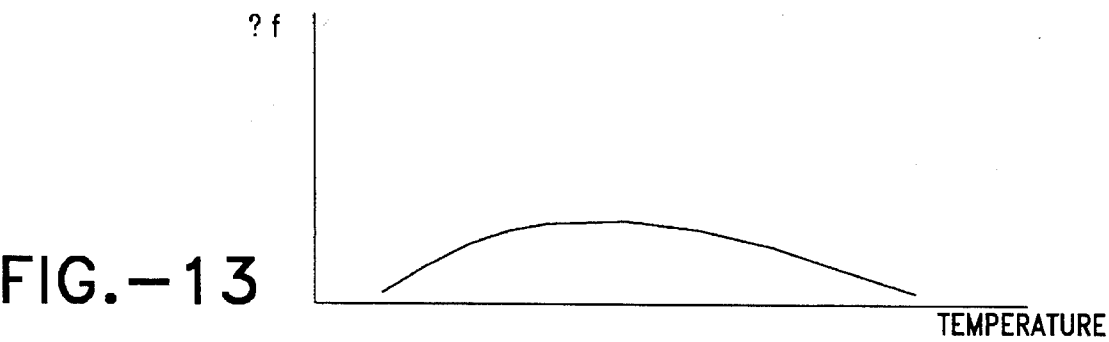
FIG.-13
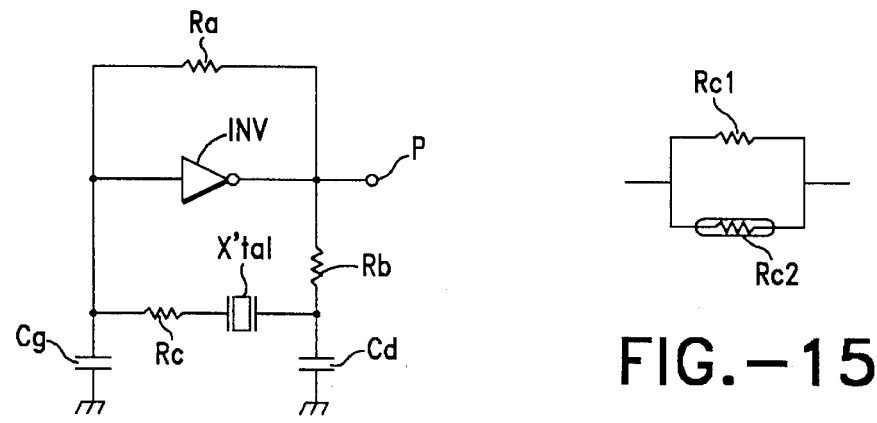
FIG.-14
FIG.-15

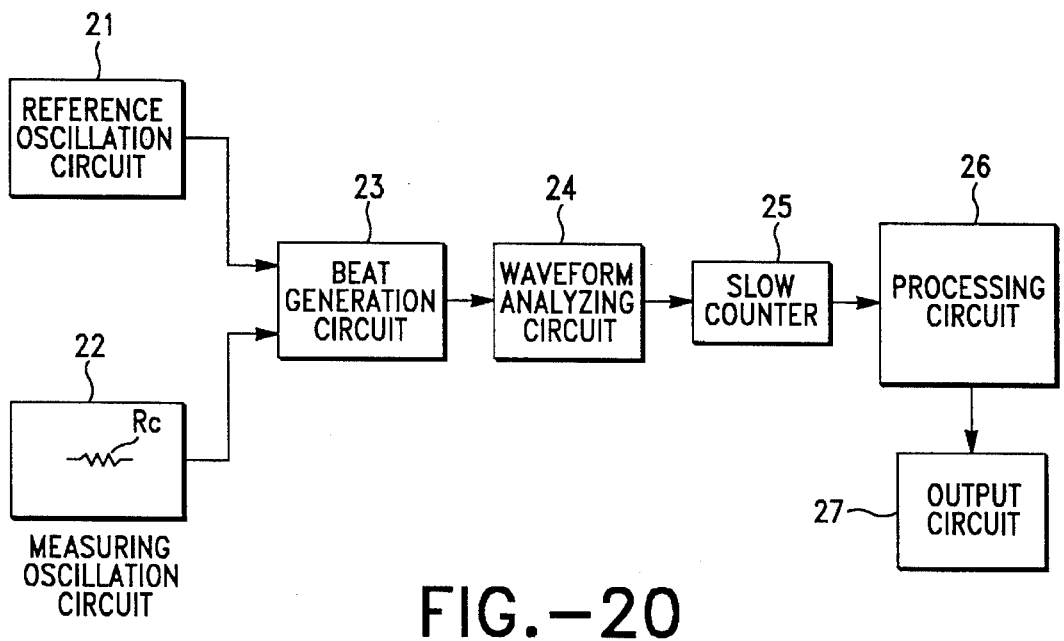
FIG.—20
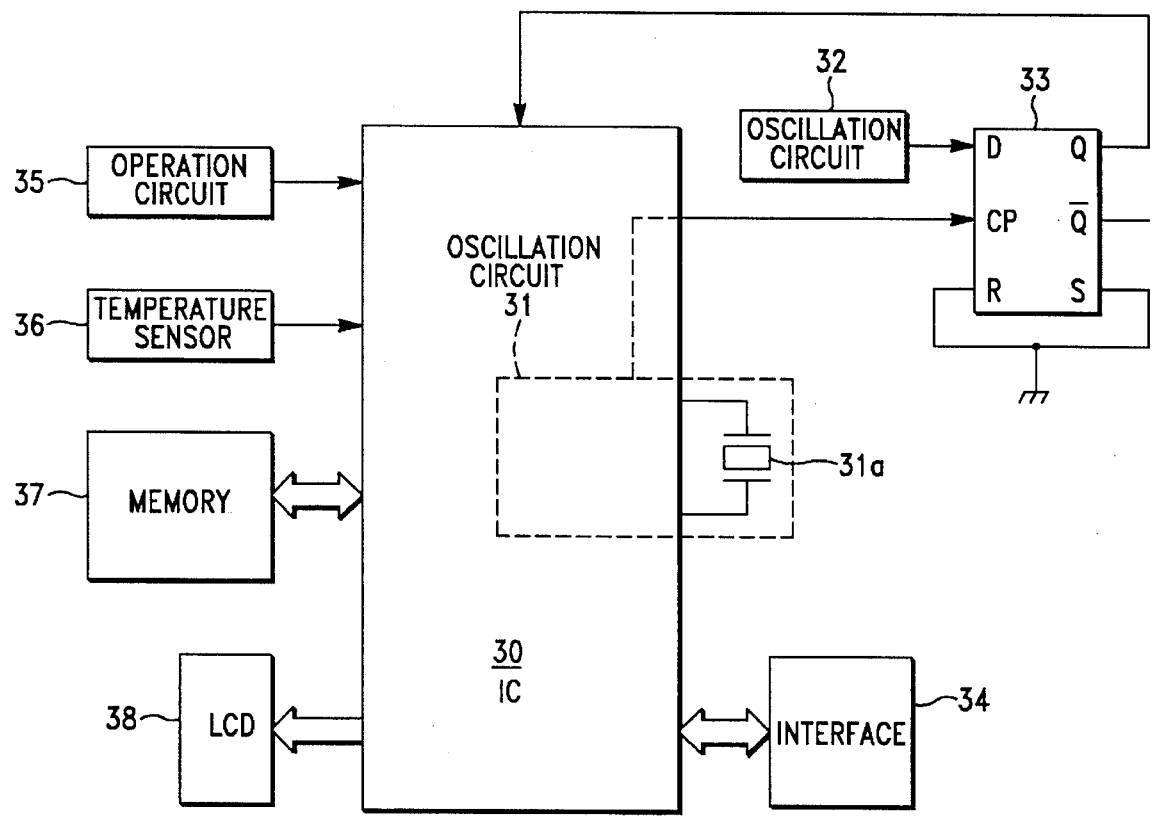
FIG.—21

5,546,810

PRESSURE MEASURING DEVICE AND METHOD USING QUARTZ RESONATORS

BACKGROUND OF THE INVENTION

1. Field of the Invention

The present invention relates generally to a device and method for measuring pressures, and more particularly, to a method for performing more accurate measurement at low cost.

2. Background of the Invention

One type of conventional pressure measuring device receives an analog output produced by a semiconductor strain gauge and converts it to a digital output. This type of device has a resistor layer formed on a surface of a semiconductor such as silicon and measures a change in resistance caused by an induced strain on the semiconductor by an applied pressure. An output is obtained through a bridge circuit configured with a plurality of resistor layers for temperature compensation. The pressure measuring device utilizing a semiconductor strain gauge provides a measurement of high accuracy by means of the bridge circuit. A drawback of the device, however, is that it is very expensive to manufacture because of high cost of a strain gauge and AD converter.

Another type of pressure measuring device, which can be manufactured at a reduced cost, measures a frequency of a quartz resonator. More particularly, this type of device measures the difference in oscillation frequency between two quartz resonators: one placed in a reference pressure such as vacuum or air atmosphere and the other placed under an applied pressure to be measured. This type of devices are disclosed in, for example, Japanese laid-open patents SHO 54-158275, SHO 57-12342, SHO 59-67437, and HEI 3-248028. Although these devices can be manufactured at low cost, they do not necessarily provide an accurate pressure measurement on account of temperature characteristics of the quartz resonators. Particularly, if inexpensive quartz resonators are used, measurement wildly varies.

A method for improving temperature characteristics of pressure measuring devices utilizing quartz resonators is demonstrated in Japanese laid-open patent HEI 3-189528. In this method difference in oscillation frequency between two oscillation circuits, one having a quartz resonator placed in vacuum and the other having another quartz resonator in an atmospheric pressure, is counted by a counter. A pressure measuring unit computes the pressure using the measured count and also performs temperature calibration in use of a linear mathematical formula, which has been determined in advance from four count measurements under two known pressures and two known temperatures. The calibration formula is obtained from the four pairs of data on the assumption that the difference in frequency between the two oscillation circuits is linear with temperature and that the formula itself is a linear function of temperature.

However, the temperature characteristic varies depending on different intrinsic physical properties of individual quartz resonators and on different behaviors of quartz resonators under an air atmospheric pressure and vacuum. Therefore, even the aforementioned linear calibration formula does not provide accuracy of 1 hPa, which is needed for an atmospheric pressure measurement. Further, according to this method frequencies of a quartz resonator at different pressures and temperatures must be counted and calibration factors must be determined before shipment, resulting in increased cost. If one measures the characteristic of a typical quartz resonator at different pressures and temperatures only once, and applies the same calibration factors to every product, the temperature calibration will not allow for good accuracy because of variation of characteristics of individual quartz resonators assembled in pressure measuring devices.

What is needed then is a method for improving the accuracy of pressure measurement performed in use of quartz resonators by means of appropriate temperature calibration and for implementing the temperature calibration at lower cost.

SUMMARY OF THE INVENTION

The present invention relates to a pressure measuring device utilizing a pair of quartz resonators, which provides pressure difference based on measured difference in oscillation frequency between the two quartz resonators placed under different pressures. This pressure measuring device exhibits large temperature dependence caused by temperature dependence of the quartz resonators. Therefore, appropriate temperature calibration is needed for accurate measurement of pressure difference. The present invention provides a method for accurate calibration by using a quadratic calibration formula with parameters easily obtained. The present invention also provides a simple, reliable temperature compensation method by inserting temperature dependent resistors in at least one of the oscillation circuits having a quartz resonator.

An object of the present invention is to improve performance of a method or device for measuring a pressure by measuring a difference in oscillation frequency between two oscillation circuits each having a quartz resonator (first resonator and second resonator) which is placed under a different pressure from each other. The first method of the present invention demonstrates is to calibrate a measured pressure value derived from a measured difference in oscillation frequency between the first and second quartz resonators which change their characteristics according to ambient temperatures, using a temperature calibration formula of a quadratic or higher order. This method compensates the temperature characteristics resulting from the variations of turning points and quadratic temperature coefficients of quartz resonators under different pressures. It also compensates the temperature characteristics caused by variation in intrinsic physical properties (that is, turning points and quadratic temperature coefficients) of individual quartz resonators.

The temperature calibration formula is preferably determined by placing each of the first and second quartz resonators under a pressure which the resonator is ordinarily to be placed under (For example, if one crystal resonator is intended to be placed in vacuum and the other under a pressure to be measured, one quartz resonator should be placed in vacuum and the other under the range of a pressure to be measured.) and by measuring differences in oscillation frequency between the two oscillation circuits at least three different temperatures. In this case, since the pressures under which the quartz resonators are placed remain the same, the determination of the calibration formula is simpler.

The hardware configuration to implement this method comprises a measuring means for outputting a measured value corresponding to difference in oscillation frequency between the two oscillation circuits, a temperature sensing means for sensing an ambient temperature of the first and second quartz resonators, a storage means for storing calibration parameters (that is, three sets of data corresponding to a given pressure, two sets of relative data with reference to the data associated with one temperature, a table of temperature calibration values computed using the above-mentioned three sets of data for a given rage of temperatures, or a table of pressures calibrated with respect to the temperatures) determined by the measurements of differences between the oscillation frequencies at minimum three temperatures, and a calibration computing means for computing calibration using the calibration parameters and the ambient temperature. In this method temperature compensation is carried out using the calibration parameters which essentially correspond to the differences of oscillation frequencies measured at minimum three temperatures. Therefore, it can compensate the different temperature dependencies of turning points and quadratic temperature coefficients of the quartz resonators under different pressures. It can also compensate the variation of temperature dependence caused by the variation in intrinsic physical properties of the individual quartz resonators.

A preferable calibration computing means obtains a temperature calibrated value for a measured value by substituting an ambient temperature for a temperature in a calibration formula of quadratic or a higher order with regard to temperature, where the calibration formula is determined with the calibration parameters. In this case, since the calibration computing means obtains a temperature calibrated value for a measured value by substituting an ambient temperature for a temperature in the calibration formula of quadratic or higher order with regard to temperature, the amount of data to be stored is minimal.

A preferable storing means for storing calibration parameters has a table of temperatures vs. temperature calibrated values, after-calibration measured values, or after-calibration measured pressures. These tables are associated with the calibration formula of quadratic or higher order with regard to temperature, which is determined with the calibration parameters. Further, a preferable calibration computing means determines a calibrated value, after-calibration measured value, or after-calibration measured pressure for a given ambient temperature in referring to the table. In this case temperature calibration is carried out by using a measured ambient temperature and referring to the table that corresponds to the temperature calibration formula of a quadratic or higher order with regard to temperature. Therefore, more data must be stored, but temperature calibration can be carried out without a computing means.

Furthermore, it is desirable to select first and second quartz resonators so that their turning point difference caused by variation in intrinsic physical properties cancels an amount of variation caused by pressure difference which the two quartz resonators are exposed to. In this case, since the difference in turning point caused by variation in intrinsic physical properties cancels their difference caused by the pressure difference which the two quartz resonators are exposed to, the difference in turning point between the two quartz resonators arranged for an actual pressure measurement is reduced. As a result, the symmetry of the temperature calibration formula is improved and a calibration value is reduced. A value of a turning point of a quartz resonator varies according to a cut angle of a quartz crystal. Using appropriate cut angles one may obtain two quartz resonators so that the difference between their turning points significantly reduces. In particular, it is possible for a turning point of one quartz resonator to almost completely cancel that of the other. A plate having a plane perpendicular to the optical axis (referred to as the Z-axis) of a quartz crystal is referred to as the Z-plate. The cut angle $\theta$ is defined as an angle of the counterclockwise rotation of the Z-plate by the Electrical axis (referred to as the X-axis). Quartz resonators are cut out from quartz crystals with these various cut angles to control values of turning points.

The second method which the present invention demonstrates includes a means for producing an output corresponding to a measured difference in oscillation frequency between the two oscillation circuits and one or more temperature dependent resistors connected to at least one of the two oscillation circuits so that it modifies the temperature dependence of the oscillation frequency of that oscillation circuit and reduces the temperature dependence of the oscillation frequency difference between the two oscillation circuits. In this case the temperature dependencies of the oscillation frequencies of the first and/or second quartz resonators are modified by the temperature dependent resistors connected to the oscillation circuits, and accordingly, the temperature dependence of the oscillation frequency difference is reduced. As a result, measurement errors can be reduced inexpensively without complex calibration processes.

A preferable temperature dependent resistor is a thermistor having a negative thermal coefficient or a monolithic resistor having a positive thermal coefficient. In particular, an FET channel resistor is desirable as a monolithic resistor. In this case the temperature dependence of the oscillation frequency difference can be reduced reliably. When a monolithic resistor is used as a temperature dependent resistor, integration of a measuring circuit is simplified. When an FET channel resistor is used as a temperature dependent resistor, a measuring circuit can be configured with a general-purpose integrated circuit.

It is preferable to have the temperature dependent resistor to be connected in parallel to another temperature dependent resistor having different temperature dependence. In this case the temperature dependence of the resultant resistance can be adjusted to the temperature dependence of the oscillation circuit. This allows for accurate temperature calibration.

The third method of the present invention comprises a means for producing an output corresponding to a measured oscillation frequency difference between the two oscillation circuits, one or more temperature dependent resisters connected to at least one of the two oscillation circuits so that it modifies the temperature dependence of the oscillation frequency of that oscillation circuit and reduces the temperature dependence of the oscillation frequency difference, a means for measuring an ambient temperature of the first and second quartz resonators, and a means for performing temperature calibration on the measured value for the ambient temperature using a given mathematical calibration formula. This scheme of temperature calibration, based on the mathematical formula in addition to insertion of a temperature dependent resistor in the oscillation circuit to reduce the temperature dependence, makes selection of temperature dependent resistors easier and reduces an amount of calibration and its rate of change obtained from the mathematical formula. This further allows for reduction of measurement errors.

A preferable temperature calibration means calibrates a measured value using a mathematical formula of quadratic or higher order with regard to temperature. In this case, since the calibration is performed using the mathematical formula of quadratic or higher order with regard to temperature, it calibrates temperature dependencies of both the differences in turning point and second order temperature coefficient between the quartz resonators placed under different pressures. It also calibrates different temperature dependencies of the quartz resonators caused by variation in intrinsic physical properties.

In the three methods mentioned above a preferable means for measuring the difference in oscillation frequency between the first and second oscillation circuits includes a beat generation means for forming a beat signal based on the signals from both the oscillation circuits and a counting means for measuring the beat frequency. Since the frequency of the beat signal obtained by the beat generating means is low, neither high frequency processing nor high frequency circuit such as a high speed counter is needed. This reduces manufacturing cost and power consumption.

A preferable beat generating means detects and holds a state of the signal from one of the two oscillation circuits in synchronizing with the signal from the other oscillation circuit and outputs the state value. In this case, since the beat signal is generated by detecting and holding a state of the signal from one of the two oscillation circuits in synchronizing with the signal from the other oscillation circuit and by outputting the state value, the circuit for the beat generating means that maintains the beat cycle information can be made simpler.

A preferable counting means of beat cycles detects a state of the beat signal at a given phase of every beat cycle and rechecks the state of the beat signal at a predetermined period of time shorter than the beat period after that detection. In this case, since the beat cycles are counted in rechecking the state of the beat signal at a predetermined time shorter than the beat period after that detection, signal processing for the beat signal is not necessary and accurate counting is performed regardless noise and a wave form of the beat signal, as far as the beat signal includes the information of the beat cycles.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 is a diagram showing distribution of turning points of quartz resonators used in Embodiment 1 of the present invention.

FIG. 7 is a diagram showing distribution of second order temperature coefficients of quartz resonators used in Embodiment 1 of the present invention.

FIG. 8 is a diagram showing temperature dependence of difference in oscillation frequency between two quartz resonators with their turning point difference as parameter when difference in second order temperature coefficient between the two quartz resonators is positive.

FIG. 9 is a diagram showing temperature dependence of difference in oscillation frequency between two quartz resonators with their turning point difference as parameter when difference in second order temperature coefficient between the two quartz resonators is negative.

FIG. 10 is a diagram showing variation of turning point as a function of cut angle for forming a quartz resonator from a quartz crystal.

FIG. 11 is a diagram showing temperature dependence of difference in oscillation frequency between two quartz resonators, each having a significantly different turning point from the other.

FIG. 12 is a diagram showing temperature dependence of resistance of a thermistor.

FIG. 13 is a diagram showing temperature dependence of difference in oscillation frequency between two quartz resonators which are modified with thermistor.

FIG. 14 is a circuit diagram showing configuration of an oscillation circuit employing a quartz resonator used in Embodiment 2 in the present invention.

FIG. 15 shows an example of compound resistors substituted for a resistor $R_c$ in FIG. 14.

FIG. 20 is a block diagram showing a major part of Embodiment 2 in the present invention.

FIG. 21 is a block diagram showing actual hardware configuration.

DESCRIPTION OF THE PREFERRED EMBODIMENTS

Embodiments of the present invention are described with reference to the drawings.

Embodiment 1

Figure 1:
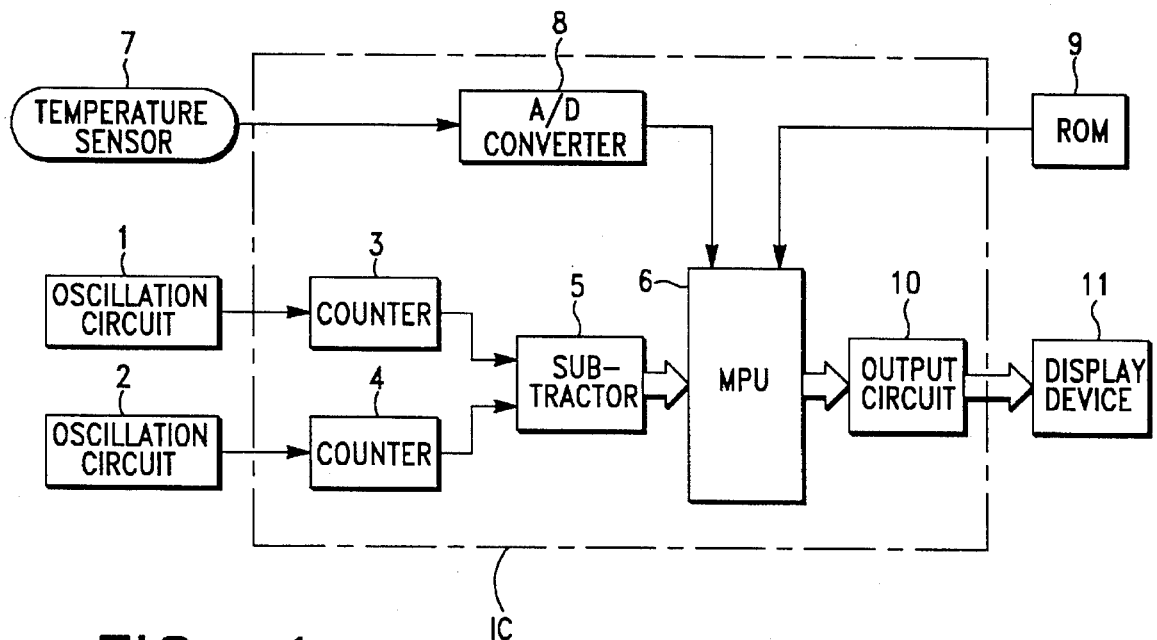
FIG. 1 shows a block diagram of a pressure measuring device using quartz resonators described in Embodiment 1 of the present invention.

FIG. 1 indicates a circuit block diagram showing the entire configuration of the pressure measuring device of Embodiment 1 according to the present invention. Reference numeral 1 represents an oscillation circuit accommodating a reference quartz resonator placed in vacuum and 2 another oscillation circuit including a measurement quartz resonator placed in an atmosphere, oscillator circuits 1 and 2 oscillating at frequencies $f_1$ and $f_2$, respectively. The oscillation pulses are led to an IC including a four-bit MPU. The IC comprises counters 3 and 4 that count numbers of the input oscillation pulses for a predetermined period, and a subtracter 5 that subtracts the counts from counter 4 from those from counter 3. The output of subtracter 5 that corresponds to the difference in oscillation frequency between oscillation circuits 1 and 2, $\Delta f = f_1 - f_2$, is sent to MPU 6.

A temperature sensor 7 made of a thermistor, for example, measures an ambient temperature of quartz resonators 1 and 2. The measured value is sent to MPU 6 through an AD converter 8. MPU 6 performs a pressure calibration computation based on the temperature measured by temperature sensor 7 and the temperature calibration values provided from a ROM 9. MPU 6 then adds the obtained pressure calibration to the measured pressure provided by subtracter 5 to obtain a calibrated pressure value, which is fed to a display device 11 such as a Liquid crystal display through an output circuit 10.

Figure 2:
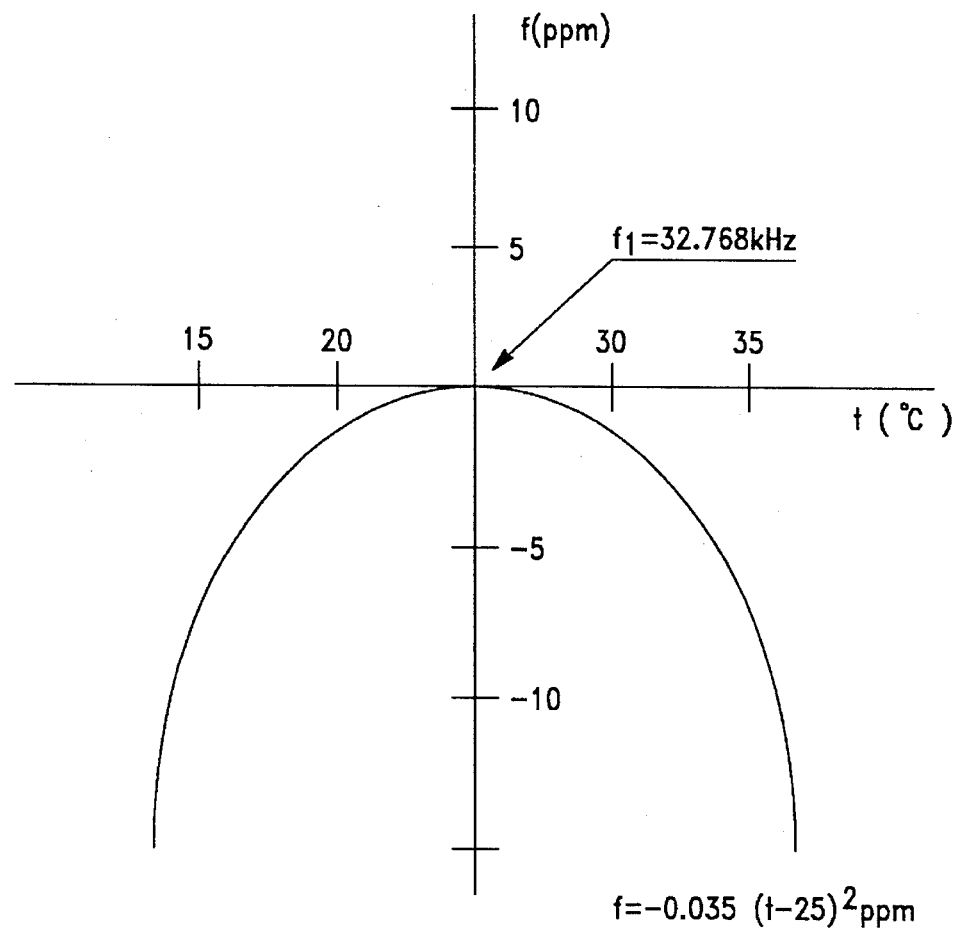
FIG. 2 shows typical temperature dependence of oscillation frequency of a quartz resonator used in Embodiment 1 of the present invention.

Quartz resonators used for oscillation circuits 1 and 2 are tuning fork type resonators having a negative second-order temperature coefficient as shown in FIG. 2. A quartz resonator in this example is designed to have a taming point, which is an apex of the parabola, at approximately 25° C. in taking consideration of using the oscillator at room temperature. This quartz resonator is less expensive and consumes less power. It exhibits, however, a poorer temperature characteristic than an AT cut quartz resonator that has an improved temperature characteristic.

Figure 3:
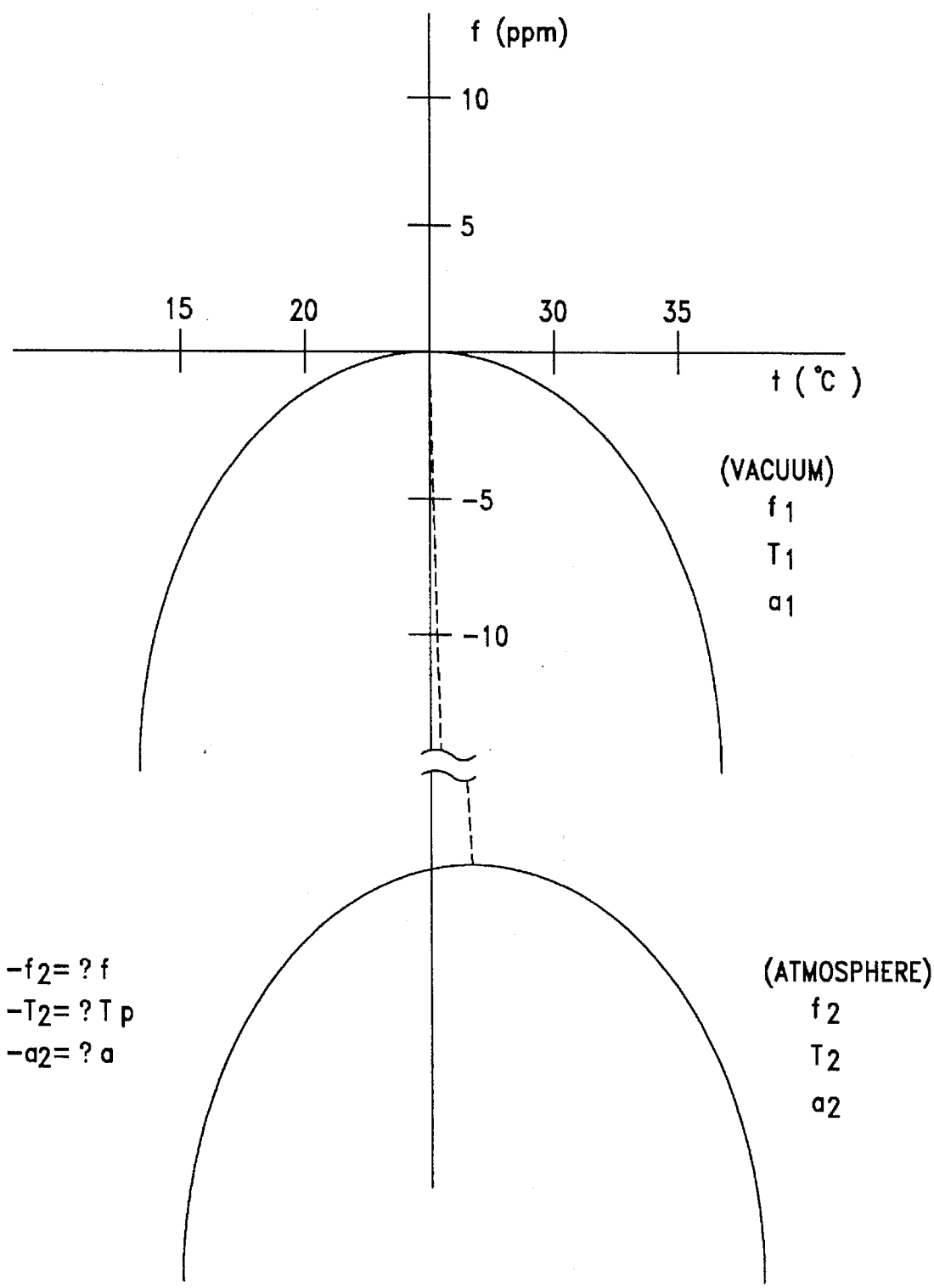
FIG. 3 is a diagram illustrating difference in temperature dependence between quartz resonators placed under vacuum and an ordinary atmosphere as described in Embodiment 1 of the present invention.

FIG. 3 shows pressure dependence of the temperature characteristic of an oscillation circuit utilizing a quartz resonator. For a typical quartz resonator placed in vacuum and connected to an oscillation circuit, the oscillation frequency $f_1=32.768$ kHz, the turning point $T_1=25.0°$ C., a coefficient $a_1=-0.035$ ppm/°$C^2$. Let the oscillation frequency, the taming point, and the second-order temperature coefficient be $f_2$, $T_2$, and $a_2$, respectively, for the same quartz resonator placed in an atmosphere. Then we have:

$f_1 - f_2 = \Delta f = 122$ ppm($\sim$4Hz)

$T_1 - T_2 = \Delta T_p = -0.5°C$ $a_1 - a_2 = \Delta a = 0.005$ ppm/$C°^2$.

Quartz resonators of this type show the variation of $\Delta T_p$ from a few tenths to a few tens of ° C in the negative sign. The variation of $\Delta a$ is small and in the positive sign. The axes of ordinates in FIGS. 2 and 3 indicate frequency f relative to $f_1$ in the ppm unit.

Figure 4:
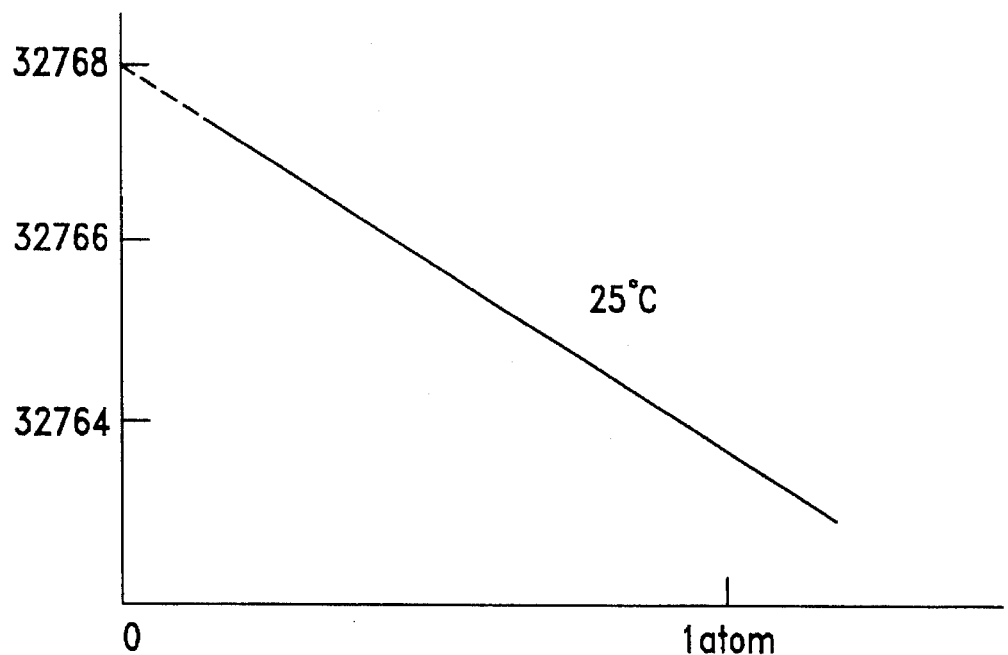
FIG. 4 is a diagram showing oscillation frequency as a function of pressure for a quartz resonator used in Embodiment 1 of the present invention.
Figure 5:
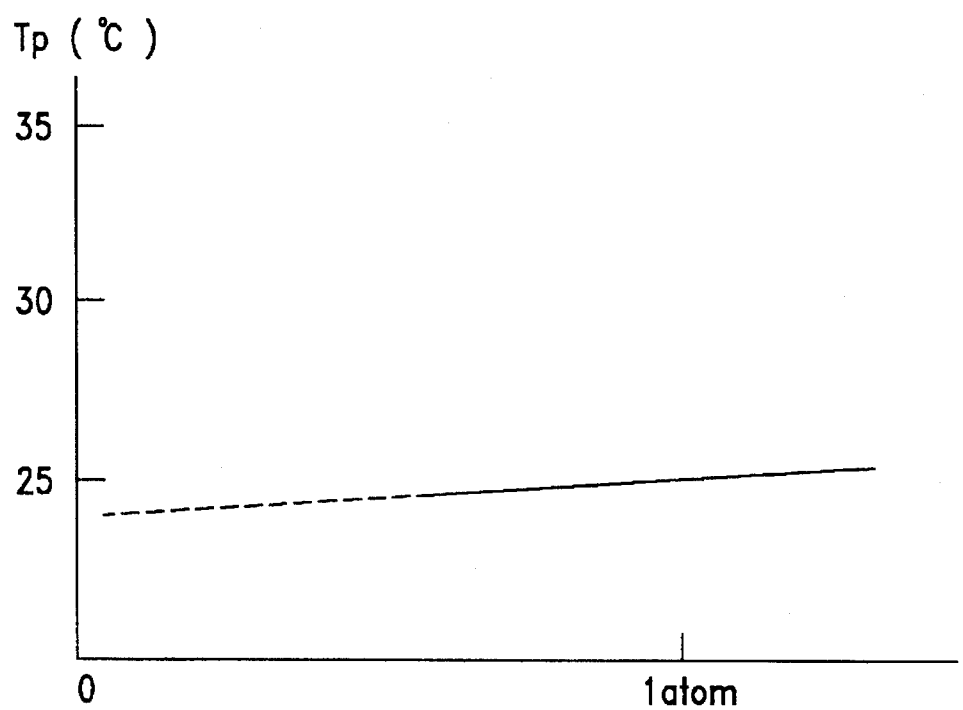
FIG. 5 is a diagram showing turning point as a function of pressure for a quartz resonator used in Embodiment 1 of the present invention.

FIG. 4 shows pressure dependence of oscillation frequency of a quartz resonator placed in the environment maintained at 25° C., while FIG. 5 shows pressure dependence of turning point $T_p$. As seen in the figures both the oscillation frequency and turning point vary almost linearly with pressure. Pressure measurement using quartz resonators takes advantage of variation of oscillator frequency with pressure as shown in FIG. 4, but the variation is also very sensitive to a change in temperature as shown in FIG. 2. Therefore, in the configuration in which the quartz resonator of the oscillation circuit 1 is placed in vacuum in FIG. 3 as a reference oscillator, and that of the oscillation circuit 2 is placed in an atmosphere to be measured as a measuring oscillator, the difference between the two frequencies cancels the temperature dependencies of the two quartz resonators and provides an improved, somewhat temperature independent pressure measurement For example, if the differences in turning point $\Delta T_p$ and in second-order temperature coefficient $\Delta a$ between the two quartz resonators are zero, then the temperature characteristics of the two resonators are identical. Consequently, the temperature dependencies are completely canceled out. Actually, however, there is a difference between the turning points of the quartz resonators placed at vacuum and atmospheric pressures as shown in FIG. 5. In this case, if the difference between the second-order temperature coefficients $\Delta a$ is zero, then the measured pressure varies as a linear function of temperature. Therefore, calibration may be made by a linear function as described in the Japanese laid-open patent HEI 3-189528.

It was discovered that there is always a finite difference in second-order temperature coefficients $\Delta a$ in the pressure measurement scheme mentioned above and that the difference in second-order temperature coefficients $\Delta a$ significantly contributes to the aforementioned atmospheric pressure measurement. That is, the difference between the two frequencies ($\Delta f = f_1 - f_2$) is expressed as a quadratic function of temperature as shown below:

$$\begin{aligned}
\Delta f &= [a_1(t-T_1)^2 + b_1] - [a_2(t-T_2)^2 + b_2] \quad (1)\\
&= (a_1 - a_2)t^2 - 2(a_1 T_1 - a_2 T_2)t + \\
&\quad (a_1 T_1^2 - a_2 T_2^2) + (b_1 - b_2)\\
&= \Delta a t^2 + Ct + D
\end{aligned}$$

where, $$\begin{aligned}
C &= -2(a_1 T_1 - a_2 T_2)\\
&= -2[a_1 T_1 - (a_1 + \Delta a)(T_1 + \Delta T_p)]\\
&= 2(a_1 \Delta T_p + \Delta a T_1 + \Delta a \Delta T_p)\\
D &= (a_1 T_1^2 - a_2 T_2^2) + (b_1 - b_2)\\
&= a_1 T_1^2 - (a_1 + \Delta a)(T_1 + \Delta T_p)^2 + \Delta f_0\\
&= -(a_1 + \Delta a)(2\Delta T_p T_1 + \Delta T_p^2) + \Delta f_0
\end{aligned}$$

$\Delta f_0 = b_1 - b_2$.

Therefore, the second-order calibration according to the equation (1) is required in order to obtain an accuracy needed for measurement of an atmospheric pressure. Since the above-mentioned temperature characteristic of the quartz resonator induces a larger error for a larger temperature variation, the accuracy of the temperature calibration described in the Japanese laid-open patent HEI 3-189528 rapidly deteriorates for a large temperature variation.

The physical properties, such as the turning point and the second-order temperature coefficient, of the quartz resonators of oscillation circuits 1 and 2 may be different when they have been manufactured. Thus, these variations of the intrinsic physical parameters must also be taken into account for pressure calibration, when the aforementioned scheme is applied to a pressure measurement. For example, FIGS. 6 and 7 indicate distributions of turning points and second-order temperature coefficients of a typical lot of quartz resonators, respectively. Both the distributions show larger variations than that due to pressure difference between vacuum and an atmosphere. Therefore, if two arbitrary quartz resonators are chosen from this lot to measure pressure difference of vacuum and an atmosphere, a larger calibration is needed than when two quartz resonators having an identical temperature characteristic are used for the same pressure measurement.

The difference between the oscillation frequencies due to variation of intrinsic physical parameters also depends on the differences in turning points and second-order temperature coefficients between two quartz resonators. Thus, Equation (1) also holds to this case by interpreting those parameters in the equation as parameters characterizing differences of intrinsic physical parameters between the two quartz resonators. That is, the temperature dependence of frequency difference due to the variation in intrinsic physical parameters of the quartz resonators is expressed by the same formula as Equation (1), which describes the temperature dependence of frequency difference due to pressure difference.

Taking the above-mentioned facts into consideration for this embodiment the temperature calibration for quartz resonators is done as follows: first, after a device is assembled, the frequency difference Δf between quartz resonator 1 placed in vacuum and quartz resonator 2 in the atmosphere is measured at three different temperatures. The desirable temperatures for the measurement are a temperature each near, below, and above the turning points of oscillation circuits 1 and 2. One may store those temperatures in the ROM and use them for the measurement, or one may input the temperatures measured with the temperature sensor 7 when the measurement is carded out. The measured frequency differences Δf together with the temperatures are stored as three sets of 8-bit digital data in ROM 9 configured with an EEPROM, for example. Instead, the measured values and the temperatures may be stored as the relative values to those near the turning points as two sets of data.

The measurement at practically three different temperatures determines the coefficients of the quadratic Equation (1): Δa, C, and D. From these values one can obtain the following calibration formula:

$$\Delta f_s = \Delta f(\Delta a T_s^2 + CT_s + D)/(\Delta a t^2 + Ct + D), \quad (2)$$

where $T_s$ is a reference temperature used for calibration of a measured value. The temperature calibration formula, Equation (2), provides a reference measured value $\Delta f_s$, which corresponds to the difference between the oscillation frequencies at the temperature $T_s$. The $\Delta f_s$ is expressed as a function of an ambient temperature t temperature sensor 7 measures as well as a measured oscillation frequency difference Δf. FIG. 4 shows a linear relation between pressure and oscillation frequency. Therefore, the difference in oscillation frequency between the two quartz resonators is proportional to the difference between the pressures that the two quartz resonators are exposed to, and hence the calibrated pressure is obtained by multiplying a constant value into $\Delta f_s$.

Now the quadratic equation (1) is rewritten as:

$$\Delta f = \Delta a t^2 + Ct + D = \Delta a (t-c)^2 + d.$$

If the reference temperature $T_s$ is set to be $T_s = c$ (c takes on a different value for a different device.), then the reference measured value is given as:

$$\Delta f_t = \Delta f(d/(\Delta a(t-c)^2 + d)) \quad (3)$$

Once the coefficients of the quadratic equation (1) and $T_s$ are determined, MPU 6 computes the calibration formula (2) or (3) using those values on every pressure measurement. FIG. 1 does not show a means for setting a pressure for the display. However, when the aforementioned temperature calibration values are input, the measured pressure itself is also input by a setting means (a device to input data from a pressure gauge; not shown in FIG. 1 ) and the proportional constant for converting a measured reference value $\Delta f_s$ or $\Delta f_t$ to a pressure is determined. Another calibration method based on the quadratic (1) is described in Embodiment 2.

In the present embodiment the oscillation frequency difference between oscillation circuits 1 and 2 is expressed in a quadratic formula of temperature. Therefore, the temperature dependence of oscillation frequency difference between the two quartz resonators caused by different pressures the two quartz resonators exposed to and the temperature dependence of oscillation frequency difference between the two quartz resonators having different intrinsic physical properties are able to be calibrated simultaneously. Thus, inexpensive tuning fork type resonators can be used for highly accurate pressure measurements.

FIGS. 8 and 9 show the temperature dependence of oscillation frequency difference Δf between two quartz resonators, one placed in vacuum and the other in an atmosphere, for cases in which the difference of their second-order temperature coefficients Δa is $+0.005 \times 10^{-6}$ ppm/°$C^2$ and $-0.005 \times 10^{-6}$ ppm/°$C^2$, respectively, with the difference of their turning points as parameter. The differences of turning points and second-order temperature coefficients results from difference in pressure between the two quartz resonators and variation in their intrinsic physical parameters.

These figures show that when the difference in turning point between the two quartz resonators $\Delta T_p = 0°$ C. (drawn with heavy curves), the oscillation frequency difference Δf is a symmetrical curve of second order around the training point. However, when a magnitude of $\Delta T_p$ increases, the symmetry is lost and the Δf rapidly varies in either the higher or lower temperature side. Therefore, if two quartz resonators having the same turning points are used, then computation for calibration is simplified. Furthermore, the temperature calibration measurements may be carried out at only two temperatures not equal to the turning point. Since this provides the least sum of calibrated values in an ordinary temperature region, the temperature calibration is the most reliable.

A pair of quartz resonators may be selected so that the difference of their turning points due to variation in intrinsic physical properties cancels the variation in turning point due to pressure difference. For example, consider the same case as above where one quartz resonator is placed in vacuum (reference pressure) and the other in an atmosphere (pressure to be measured). If the turning point increases by $+0.5°$ C. when the pressure changes from vacuum to one atmospheric pressure, a pair of quartz resonators having turning point difference of 0.5° C (under the same pressure) are selected, and the one with the lower turning point is used as a measuring resonator.

Instead of a strict selection as above, a crude selection may be applied: quartz resonators are grouped in two groups, one having higher turning points, while the other having lower turning points, and then two resonators are taken from each of the two groups. That is, in this embodiment a quartz resonator for measuring an atmospheric pressure is taken from the group having lower turning points and a reference quartz resonator from the other group having higher turning points. This selection scheme allows for cancellation of variation due to pressure difference and variation in intrinsic physical properties with each other. This results in a smaller difference in turning points on measurement, an improvement in the symmetry of the calibration quadratic, and a smaller amount of calibration as a whole. All these contribute to an easier temperature calibration.

FIG. 10 shows how turning point changes when cut angle of a tuning fork type quartz resonator is varied. The quartz resonator is formed as a plane tuning fork by etching a substrate (so called the Z-plate) using a photo mask made by photolithography, the substrate being produced from a quartz crystal cut perpendicular to its optical axis (Z-axis).

The single crystal may be rotated by the electrical axis (X-axis) and then cut. The angle θ in FIG. 10 is an angle of that rotation with reference to the Z-plate. FIG. 10 shows that changing the cutting angle produces different turning points. Accordingly, two groups of quartz resonators may be prepared alternatively by using two different angles θ. A pair of quartz resonators, one taken from each group, will cancel or reduce the difference in turning point between the pair of quartz resonators placed in vacuum and an atmosphere as shown in the above.

In the present embodiment a reference quartz resonator is placed in vacuum and a measuring one in an atmosphere. Conversely, a reference quartz resonator may be placed in an atmosphere and a measuring one in vacuum for measuring vacuum pressures. It is obvious that the two quartz resonators can be placed under the other different pressures.

In the present embodiment the quadratic temperature calibration formulae (2) or (3) is used for calibration. One may use a formula of third or higher order to compensate for temperature dependencies of the above-mentioned quadratic coefficients, as well as variation in intrinsic physical properties.

Embodiment 2

The measuring quartz resonator in Embodiment 1 is exposed to an atmosphere. Therefore, materials such as oxygen are adsorbed on its surface. This causes the oscillation condition to change, and consequently, the turning point shifts with respect to that of the reference quartz resonator. Particularly, some compact quartz resonators available recently exhibit a shift of difference in turning point between the reference and measuring quartz resonators $\Delta T_p$ by as large as 20° C.

In this case the difference of turning points is considerably large, and the temperature dependence of the difference in oscillation frequency between the oscillation circuits including a reference and measuring quartz resonators, $f_1-f_2 \ne \Delta f$ (measured value), has a steep slope against temperature as shown in FIG. 11. Even a small change in temperature causes a large variation of calibration values. Therefore, the calibration based on a quadratic formula as shown in Embodiment 1, actually increases a measurement error because of a measurement error of the temperature sensor and deviation of the calibration formula from the actual temperature dependence of the frequency difference. This problem has been solved by inserting a calibration capability in an oscillation circuit itself for a quartz resonator as shown in FIG. 14.

FIG. 14 shows an oscillation circuit including a quartz resonator X'tal to which a resistor $R_c$ is connected in series. The oscillation circuit also includes a resistor $R_a$ and an inverter INV, each of which connects in parallel to the series circuit of X'tal and $R_c$. A resistor $R_b$ is connected between X'tal and an output terminal P. Capacitors $C_d$ and $C_g$ are connected between the ground and the either end of the series circuit. Conventional oscillation circuits do not use the resistor $R_c$.

Figure 16:
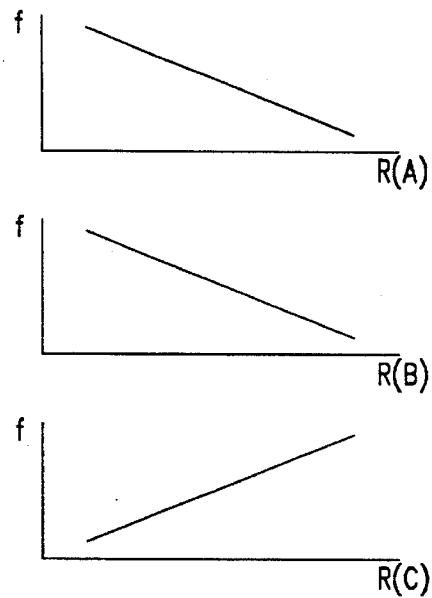
FIG. 16 illustrates general relations between oscillation frequency difference and resistors $R_a$, $R_b$, and $R_c$ shown in FIG. 14.

The oscillation frequency of this oscillation circuit decreases almost linearly as the resistance R(C) of the resistor $R_c$ decreases as shown in FIG. 16. As shown in FIG. 12 the resistance of a thermistor $R_s$ monotonically decreases as a temperature increases. Therefore, an oscillation circuit having a thermistor as the resistor $R_c$ produces a higher oscillation frequency as a temperature decreases, because resistance R(C) increases as a temperature decreases. Thus, the oscillation circuit including a measuring quartz resonator and a thermistor as the resistor $R_c$ will output a higher oscillation frequency $f_2$ than an ordinary oscillation frequency at lower temperatures. Accordingly, the difference of the oscillation frequency from the reference oscillation frequency $f_1$ is reduced. As a result, the difference between the oscillation frequencies $\Delta f=f_1-f_2$ in FIG. 11 is reduced at lower temperatures, and its temperature dependence is reduced as a whole as shown in FIG. 13.

The temperature dependence of resistance of a thermistor is not linear as shown in FIG. 12, but increases rapidly at lower temperatures. The curve of the oscillation frequency difference $\Delta f$ in FIG. 13, therefore, has an emphasized shape of FIG. 11. In order to ease this problem, the resistor $R_c$ in FIG. 14 was replaced with a thermistor $R_{c1}$ and an ordinary resistor $R_{c2}$ connected together in parallel as shown in FIG. 15. The each resistance of the thermistor and parallel resistor used in this embodiment is listed below and plotted against temperature in FIG. 17.

| Temperature | 10° C. | 25° C. | 40° C. |
|---|---|---|---|
| Thermistor | 480 KΩ | 230 KΩ | 118.6 KΩ |
| Parallel Resistor | 330 KΩ | 330 KΩ | 330 KΩ |
| Combined Resistance | 196 KΩ | 136 KΩ | 87 KΩ |

Figure 17:
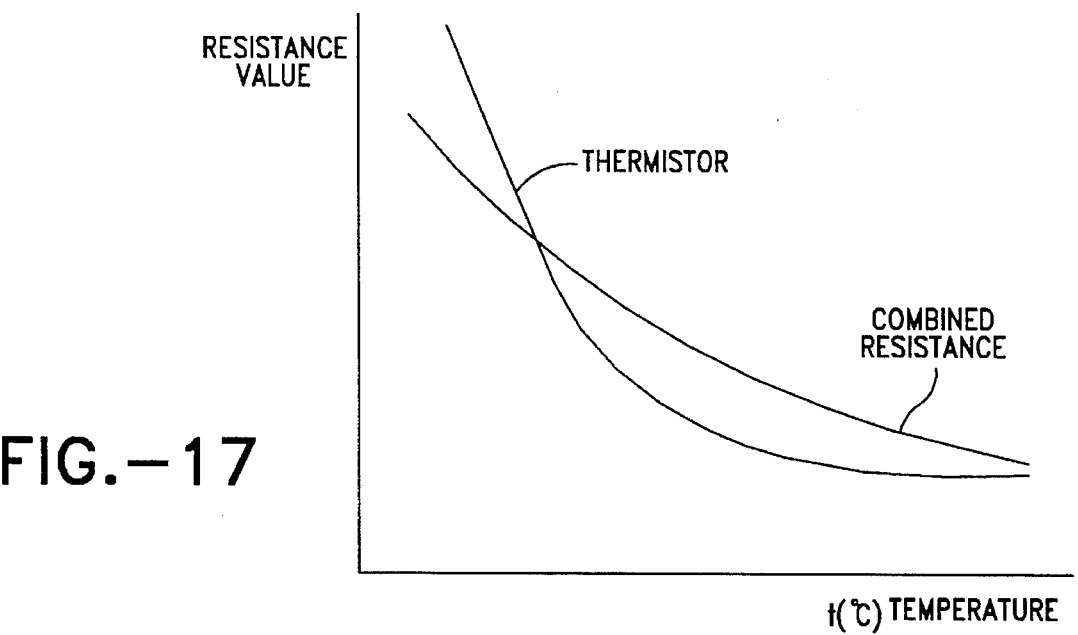
FIG. 17 is a diagram showing temperature dependencies of resistance of a thermistor and combined resistors.
Figure 18:
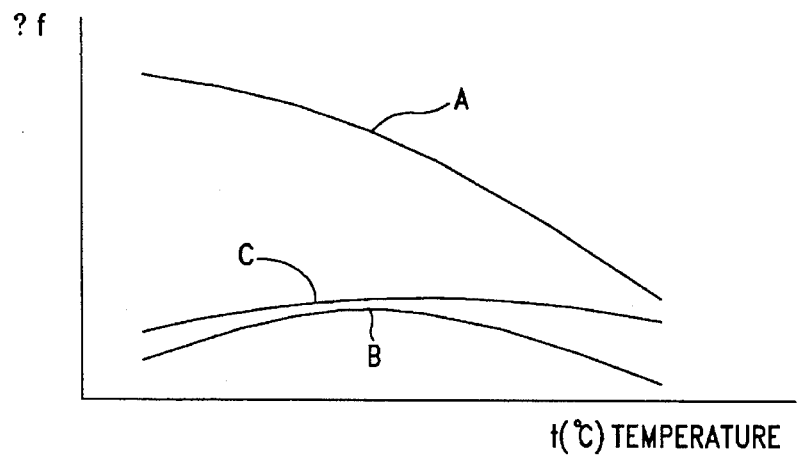
FIG. 18 is a diagram showing temperature dependencies of oscillation frequency differences for cases: (A) no modification, (B) modification with a thermistor, and (C) modification with compound resistors.

As shown in FIG. 17, the temperature dependence of the resistor $R_c$ is more linear by connecting the parallel resistor $R_{c2}$ to the thermistor $R_{c1}$. FIG. 18 shows an improvement of the temperature dependence of the difference between the oscillation frequencies by using the combined resistors including the parallel resistor. In the figure the curve A is the ordinary temperature dependence of the difference between the oscillation frequencies as shown in FIG. 11; the curve B is the temperature dependence for the case where only a thermistor is used as shown in FIG. 13; the curve C is the temperature dependence for the case where a resistor $R_{c2}$ is used as well as a thermistor. Thus, adjusting the temperature dependence of a thermistor by replacing it with combined resistors gives rise to almost flat temperature dependence of the difference $\Delta f$ between the oscillation frequencies.

The thermistor mentioned above is used as an example of a resistor having a temperature dependent resistance having a negative temperature coefficient. One can use a temperature dependent resistor that has a positive temperature coefficient also. The oscillation circuit in FIG. 14 includes resistors $R_a$ and $R_b$ in addition to $R_c$. The oscillation frequency of the oscillation circuit decreases as shown in FIG. 16 as the resistance R(A) or R(B) of the resistor $R_a$ or $R_b$ increases in contrast to the resistor $R_c$. Therefore, if a temperature dependent resistor having a positive temperature coefficient is connected to the resistor $R_a$ or $R_b$, one can expect the same effect as the above-mentioned example where the resistor $R_c$ is replaced with a thermistor.

In order to eliminate a large, monotonic slope of the temperature dependence of the difference $\Delta f$ between the oscillation frequencies caused by the large difference between the turning points $\Delta T_p$, any temperature dependent resistor may be used if its resistance varies monotonically against temperature. When $\Delta T_p$ is small, however, $\Delta f$ does not necessarily varies monotonically in the room temperature region, but may have a maximum or minimum in the region. In this case a temperature dependent resistor should have temperature dependence corresponding to the temperature dependence of $\Delta f$.

Figure 19:
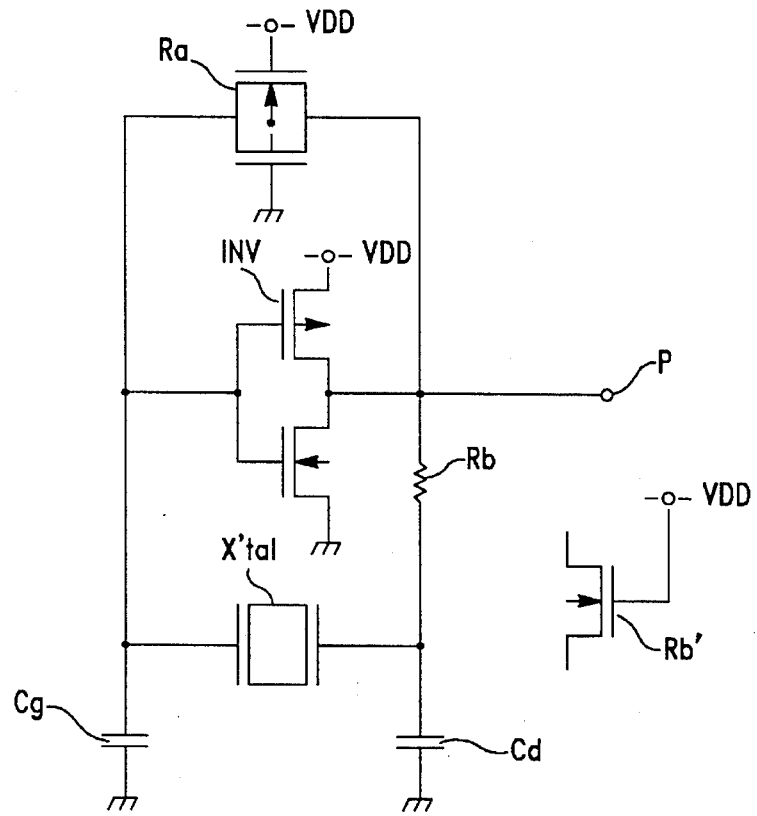
FIG. 19 is a circuit diagram showing configuration of an oscillation circuit employing different temperature dependent resistors.

A monolithic resistor in an integrated circuit may be used for a resistor having a positive temperature coefficient. The positive temperature coefficient of a monolithic resistor can be adjusted by controlling concentrations of impurities, and its resistance can be regulated by dimensions of a resistor layer and an active device. A channel resistance, equivalent resistance, and parasitic resistance of an active device such as a transistor may be used as a monolithic resistor in addition to a resistor layer formed as a passive device. FIG. 19 shows an example in which a feedback resistor of a CMOS is used for the resistor $R_a$ of the oscillation circuit. Ordinarily the resistor $R_a$ needs a high resistance of an order of 20 MΩ, which is easily obtained by this configuration. The resistor $R_b$' is a MOS channel resistor replacing with the resistor $R_b$. The resistance of the resistor $R_b$ is normally in the range of 500 kΩ.

Those various kinds of temperature dependent resistors may be used for combined resistors replacing $R_a$, $R_b$, and $R_c$ shown in FIG. 15. The parallel resistor $R_{c2}$ in this case may be a carbon resistor as before that has a small temperature coefficient However, the $R_{c1}$ and $R_{c2}$ may have a temperature dependence different from each other and reduce the net temperature dependence as combined resistors in a wide temperature range. Examples include a combination of a thermistor having a negative temperature coefficient and a monolithic resistor having a positive temperature coefficient, and a pair of thermistors that have different temperature dependencies. It is obvious that one may use three or more resistors if need be.

The curve A in FIG. 18 representing the difference Δf between the oscillation frequencies without a correction changes its slopes depending on a value of $\Delta T_p$ and its curvatures depending on a magnitude and sign of Δa. Therefore, the methods mentioned above are particularly effective to flatten uncalibrated temperature dependence.

One may use temperature dependent resistors having a negative or positive temperature coefficient in the reference oscillation circuit and another temperature dependent resistors having a negative or positive temperature coefficient different from the former in the measuring oscillation circuit to optimize the temperature dependence of the difference Δf between the oscillation frequencies. It is possible to completely eliminate temperature dependence of the quartz resonators by combining temperature dependent resistors to optimize the temperature dependence of the difference Δf between the oscillation frequencies.

Figure 22:
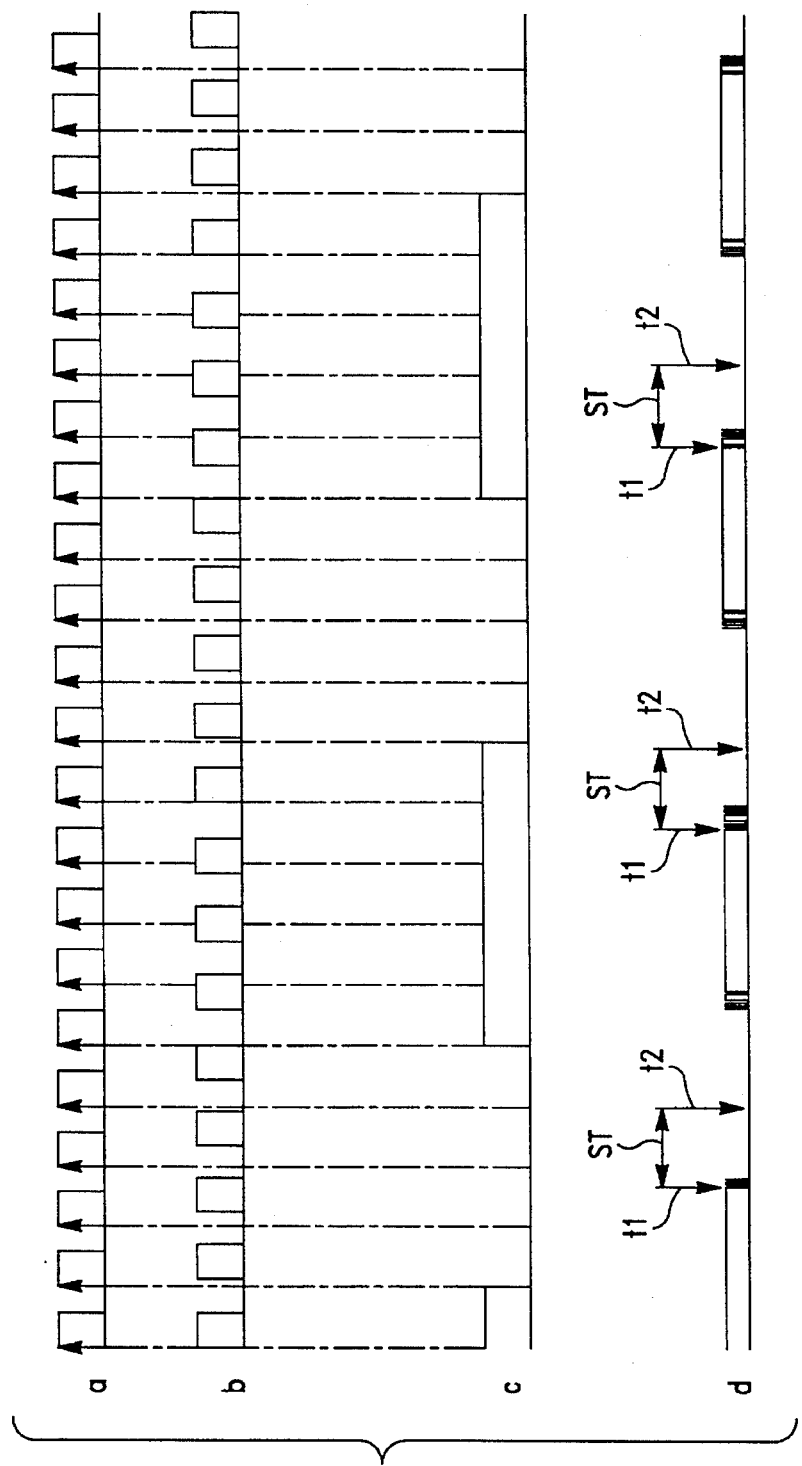
FIG. 22 is a timing chart showing (a) output signal from a reference oscillation circuit in Embodiment 2, (b) output signal from a measuring oscillation circuit, (c) beat signal formed by those two signals, and (d) wave form of actual beat signal including noise.

Shown in FIGS. 20 and 21 are the whole configuration of Embodiment 2 which includes above-mentioned temperature calibration thermistors. In some cases of Embodiment 2 the same type of temperature calibration as Embodiment 1 is performed as well. In these cases the temperature calibration with thermistors or combined resistors only has to make the temperature dependence of the difference between the oscillation frequencies Δf roughly flat, because the temperature calibration of Embodiment 1 is also used. FIG. 20 shows a general configuration of Embodiment 2 excluding the processing portion of the same calibration as Embodiment 1. A reference oscillation circuit 21 (including a quartz resonator placed in vacuum) and a measuring oscillation circuit 22 (including a quartz resonator placed under an atmospheric pressure) output square waves having frequencies $f_1$ and $f_2$, respectively. Reference oscillation circuit 21 does not include a resistor $R_c$ as shown in FIG. 14, while measuring oscillation circuit 22 uses combined resistors $R_c$ as shown in FIG. 15. The square waves produced by both the oscillation circuits are fed into a beat generation circuit 23, where the state of the square wave denoted by b in FIG. 22 from measuring oscillation circuit 22 is read at every rise of the square wave denoted by a in FIG. 22 from reference oscillation circuit 21. The read state is held until the next rise of the square wave from reference oscillation circuit 21. Thus, the beat signal $f_b(=f_1-f_2=\Delta f)$ is generated as shown in FIG. 22d. In FIG. 22 the difference between the frequencies of the output signals a and b from the oscillation circuits is drawn exaggerated just for illustration. Actual difference between the frequencies is approximately 0.02% at most.

The beat frequency $f_b$ is equal to the difference frequency Δf between the oscillation frequencies of oscillation circuits 21 and 22. The next wave-form analyzing circuit 24 produces one count pulse for every cycle of the beat signal. The count pulses are counted with a slow counter 25, and a processing circuit 26 reads accumulated counts CN at predetermined time intervals. The same temperature calibration computation as Embodiment 1 is performed based on the accumulated counts CN to obtain a calibrated measured pressure, which is then sent to an output circuit 27.

Figure 23:
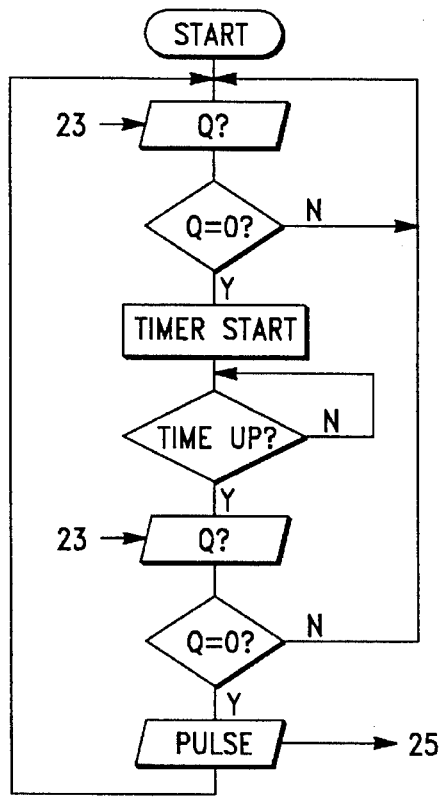
FIG. 23 is a flow chart showing procedure of a wave-form analyzing circuit implemented with software.

Aforementioned MPU 6 in Embodiment 1 can perform the same functions as a combination of wave-form analyzing circuit 24, slow counter 25, and processing circuit 26 which configure a beat detecting means. Particularly, it is preferable to implement wave-form analyzing circuit 24 in software in order to cheaply eliminate noises included in the beat signal. FIG. 23 illustrates an execution procedure of a program which is stored in the MPU to perform the same function as wave-form analyzing circuit 24. It reads the output Q of beat generating circuit 23 and a timer starts at a time t1 when the state of Q changes from 1 to 0. (Refer to FIG. 22d.) It reads the output Q of beat generating circuit 23 again at a time t2 after a predetermined time ST (Refer to FIG. 22d.) elapses in order to check whether Q=0 or not. If Q=0 at the time t2, a count pulse is produced because a cycle of beat signals is detected. If Q is not zero, the detection of the time t1 is considered to be an error and the program tries again to find a correct t1 when Q turns to zero.

Since the difference Δf in oscillation frequency between the reference and measuring oscillation circuits is considerably small in the present embodiment, a noise is easily created at the rise and fall of the beat signal. The above-mentioned procedure detects a trailing edge of the beat signal and checks the beat signal again after a predetermined time ST elapses. The predetermined time ST may be set at any length of time shorter than the period of the beat signal, preferably between approximately ¼ and ¾ of the period of the beat signal to reduce the probability of false detection due to noise. For example, the beat frequency of the present embodiment is approximately 0.01 to 0.02% of the oscillation frequencies of the quartz resonators, or roughly 4.5 Hz and the ST is set to be 50 ms, which is approximately ¼ of the period of the beat signal. In a case in which the ST is set to be approximately ¾ of the period of the beat signal, the state of the output Q to be detected when starting the dock and then confirming the state after the time ST should be reversed (Q=1 instead of detecting Q=0).

The variation of pressures to measure is in a range of a few % of the beat frequency. Therefore, the above-mentioned time ST of 50 ms always provides stable measurement of the beat frequency. Suppose that the pressure measuring device needs a resolution of 1 hPa, which corresponds to a frequency difference of 4.5/1000 Hz. Slow counter 25 can easily provide this resolution with accumulation time of 200 to 600 seconds.

FIG. 21 shows the actual hardware configuration of Embodiment 2. An IC 30 represents a 4-bit microcomputer which includes an oscillation circuit 31 (corresponding to reference oscillation circuit 21) configured with a quartz resonator 31a connected to it. An oscillation circuit 32 that corresponds to measuring oscillation circuit 22 is built separately from IC 30 on a circuit board using a quartz resonator, resistors, thermistors, inverters, and capacitors connected with each other. The outer cylinder containing the measuring quartz resonator has a hole and the quartz resonator is exposed to the atmosphere. The output from external oscillation circuit 32 is fed to D terminals of a D-flip-flop 33 (referred to as D-FF) and the output from oscillation circuit 31 in IC 30 is sent to CP terminals of D-FF 33 has the same function as beat generating circuit 23 and outputs a beat signal as shown in FIG. 22 c from Q terminals of D-FF 33 to IC 30. IC 30 counts for a given period of time beat cycles detected by the program shown in FIG. 23 and obtains the accumulated counts CN as a parameter corresponding to the difference $\Delta f$ between the oscillation frequencies of oscillation circuits 31 and 32.

IC 30 is connected with em interface 34 for data communications with external devices, an operation circuits 35 including mode selection switches, set switches, etc., a temperature sensor 36, a memory 37, and a liquid crystal display 38. After assembling a product, measurements are performed under a predetermined pressure $P_s$ at three different temperatures t (measured with temperature sensor 36) to obtain accumulated counts $CN(t, P_s)$. The three obtained pairs of data of t and CN are sent through interface 34 to an external computer, which calculates using the three pairs of data the three coefficients i, j, and k of the following equation derived from the aforementioned quadratic equation (1):

$$CN(t, P_s) = h\Delta f = h\{\Delta at^2 + Ct + D\] \quad (4)$$
$$= h\Delta at^2 + hCt + hD$$
$$= it^2 + jt + k$$

where h denotes a proportional constant between the accumulated counts CN and frequency difference $\Delta f$. If a reference temperature $T_s$ is set to be 0° C, CN(t=0) =k from Equation (4) and the calibration $\Delta S$ is given by $$\Delta S(t)=CN(O, P_s)-CN(t, P_s)=-(it^2+jt). \quad (5)$$

By calculating the $\Delta S(t)$ on every measurement or referring to a table having been made between t and $\Delta S(t)$ and stored in memory 37 one may obtain the accumulated counts CN at the reference temperature ($T_s$=0) from Equation (6), $$CN(O,p)=CN(t, p)+\Delta S(t). \quad (6)$$

Equation (4) may be rewritten as:

$$CN(t, P_s)=it^2+jt+k=i(t-m)^2+n$$

and the coefficients i, m, and n may be determined. In letting the reference temperature $T_s$ to be equal to m, $\Delta S$ is expressed as:

$$\Delta S(t)=CN(m, P_s)-CN(t, P_s)=i(t-m)^2 \quad (7)$$

Thus, the reference accumulated counts $CN(T_s=m, p)$ for the reference temperature $T_s$=m is obtained.

The pressure sensitivity $X_p$ which represents a pressure corresponding to one count of the reference accumulated counts $CN(T_s, p)$ is determined as follows:

$$X_p=P_s/CN(T_s, P_s). \quad (8)$$

Once the correction $\Delta S(t)$ and the pressure sensitivity $X_p$ are obtained, the calibrated pressure is calculated for every pressure measurement as follows:

$$P = X_p CN(T_s, p) \quad (9)$$
$$= X_p \{CN(t, p) + \Delta S(t)\}.$$

The reference accumulated counts $CN(T_s, p)$ may be obtained directly as in Embodiment 1 as follows:

$$CN(T_s,p)=CN(t,p)[(iT_s^2+jT_s+k)/(it^2+jt+k)] \quad (10)$$

One may create a table which associates the temperature t and the accumulated counts CN(t, p) with the measured pressure P using Equation (9) to obtain measured pressures directly from the table. Alternatively, one may create a table which relates the temperature t and accumulated counts CN(t, p) with the reference accumulated counts $CN(T_s, p)$ using Equation (10).

In the present Embodiment 2, one first determines the coefficients of the abovementioned quadratic equation (4) and $X_p$ after assembly of a product, then calculates with a computer the correction $\Delta S(t)$ for every given temperature interval in the room temperature range, and finally creates a table for the temperature t and the correction $\Delta S(t)$. This table is sent to memory 37 through interface 34 and stored there. Thus, this pressure measuring device can obtain a correction by simply referring to the table stored in memory 37 for a temperature t measured with temperature sensor 36 and perform calibration.

The advantage of using either pair of Equations (5) and (6) or Equations (7) and (8) for temperature calibration is that the computation process at calibration is simple by using Equations $\Delta S(t)$. Particularly, computing $\Delta S(t)$ for given temperature intervals and storing the calculated data in the memory in advance makes the process of the temperature calibration considerably simple.

The quartz resonator exposed to an atmosphere gradually changes in oscillation frequency because of physical adsorption on its surface. Accordingly, the accumulated counts CN(t, p) at a given pressure also changes. The temperature dependence itself, however, remains almost the same. Therefore, incorporating a method for calibrating absolute pressures periodically, for example, maintains the accuracy of measurement. In a case in which the pressure difference between measurements (relative pressure) is a concern, for example, weather forecast in which variation of an atmospheric pressure is measured as discussed below, the frequency aging of the quartz resonator does not affect on the measurement.

For this kind of configuration one may use an IC including only one ordinary oscillation circuit (an IC for a microcomputer having an oscillation circuit for an operation clock, an IC for driving a watch having an oscillation circuit for time measurement, and so on) as well as an external oscillation circuit to configure an inexpensive pressure measurement device. In this case a temperature dependent resistor is built in the external oscillation circuit, which makes assembly and adjustment of devices easier in manufacturing them.

In Embodiment 2 a temperature dependent resistor is used inside a measuring oscillation circuit having a quartz resonator to modify the temperature dependence of its oscillation frequency and relax the temperature dependence of the difference in oscillation frequency between both the quartz resonators for reducing the amount of calibration. Furthermore, in this embodiment, temperature calibration based on the same calibration formula as Embodiment 1 is also carried out. Thus, accurate adjustment of temperature dependence of a temperature dependent resistor is avoided and accuracy of calibration based on Equation (5) can be improved.

Furthermore, the difference in oscillation frequency between the quartz resonators is produced as their beat signal having a low frequency, which is counted with a counter such as a general-purpose device built inside an integrated circuit without using two expensive high frequency counters. Therefore, the circuit can be simpler in configuration and manufactured more cheaply. For there are less high-frequency components, the power consumption is reduced also. In addition, in spite of the simple configuration noises are easily eliminated and error measurements are readily avoided giving rise to a reliable, accurate pressure measurement.

The aforementioned embodiments 1 and 2 are particularly suitable to cases in which pressure difference between measurements is a major concern, such as weather forecast which is done based on measurements of a variation of the atmospheric pressure and an aeroflow meter in use for a fuel injection system of automobiles. When Embodiment 2 is applied to a weather forecast device, the difference between the oscillation frequencies is measured for 10 minutes every hour, for example, and is output after calibration as shown above. Weather forecast is then carried out using the pressure variation between this measurement and the previous one thus obtained, the times when the pressure curve has a maximum or minimum determined based on moving average calculated from past measurements, and the magnitude of the pressure.

A pressure measuring device manufactured according to Embodiment 2 has a sensor unit and measuring circuit unit which constitute a pressure measuring unit. It has been proved that the manufacturing cost of the pressure measuring unit is less than approximately ⅕ of a semiconductor pressure sensor, that its volume is approximately ⅓ of it, and that its power consumption is approximately ½ of it.

A calibration method using temperature dependent resistors such as thermistors was described in Embodiment 2. It is apparent that this method is effective even without a temperature calibration using a calibration formula. The generation of a beat and the method for measuring the beat frequency to obtain the difference of the oscillation frequencies can be duly applied to the calibration performed only by the quadratic calibration formula described in Embodiment 1.

INDUSTRIAL FIELD OF THE INVENTION

As described above in detail, the present invention provides a method for temperature calibration on a measured value based on a difference in oscillation frequency between two oscillation circuits, each having a quartz resonator (first and second resonator) which suffers variation of an ambient temperature, using a mathematical formula of quadratic or higher order. The present invention also provides a method for reducing the temperature dependence of the difference of the oscillation frequencies by inserting a temperature dependent resistor in at least one of the oscillation circuits to change its temperature dependence. These methods give rise to the following effects and provide considerable advantages to a pressure measurement unit for measuring an atmospheric pressure or other pressures, and a pressure measurement device.

(1) Inexpensive quartz resonators allow for an accurate pressure measurement by carrying out accurate calibration for variations of the quadratic coefficients due to pressure difference as well as calibration for the different temperature dependence between the two quartz resonators caused by variations in intrinsic physical properties.

(2) Temperature dependent resistors included in the oscillation circuit(s) modify the temperature dependence of the oscillation frequency(ies) of the first quartz resonator and/or the second quartz resonator to reduce the temperature dependence of the difference between the oscillation frequencies, improving accuracy of measurement inexpensively.

(3) The temperature calibration, based on the mathematical formula in addition to insertion of temperature dependent resistors in the oscillation circuit(s) to reduce the temperature dependence, makes selection of temperature dependent resistors easier and reduces an amount of calibration and its rate of change in using the mathematical formula. This further allows for reduction of measurement errors.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for measuring pressure, comprising the steps of:

measuring a difference in oscillation frequency between first and second oscillation circuits, with said first oscillation circuit having a first quartz resonator and said second oscillation circuit having a second quartz resonator, said first and second quartz resonators being placed under different pressures from each other;

measuring the ambient temperature of said first and second quartz resonators;

storing calibration parameters substantially corresponding to said oscillation frequency differences measured for at least three different temperatures; and performing calibration of said measured oscillation frequency difference using said calibration parameters and said ambient temperature according to a temperature calibration formula of quadratic or higher order.

2. The method according to claim 1, wherein said temperature calibration formula is determined from measurements of the difference in oscillation frequency between said two oscillation circuits, said each quartz resonator being placed under a predetermined pressure for at least three different temperatures.

3. A pressure measuring device, comprising:

first and second oscillation circuits including first and second quartz resonator, respectively, for measuring pressure based on the difference in oscillation frequency between said first and second oscillation circuits, said first and second quartz resonators being placed under different pressures from each other;

measuring means for producing a measured value corresponding to the difference in oscillation frequency between said two oscillation circuits, temperature measurement means for measuring the ambient temperature of said first and second quartz resonators, storage means for storing the calibration parameters substantially corresponding to said oscillation frequency differences measured for at least three different temperatures, and calibration computing means for performing calibration of said measured value using said calibration parameters and said ambient temperature.

4. The measuring device according to claim 3, wherein said calibration computing means performs temperature calibration for said measured value with regard to said ambient temperature according to a temperature calibration formula of quadratic or higher order specified by said calibration parameters.

5. The measuring device according to claim 3, wherein said storage means for the calibration parameters stores a table for temperatures and values selected from the group comprising temperature calibration values, calibrated measured values, and measured pressure values derived from the temperature calibration formula of quadratic or higher order, said formula being specified by said calibration parameters, and said calibration computing means determines the temperature calibration values, calibrated measured values, or measured pressure values corresponding to said ambient temperature by referring to said table.

6. The measuring device according to claim 3, wherein said first and second quartz resonators are selected so that the intrinsic difference in turning point between said first and second quartz resonators cancels the change in turning point due to the difference between the pressures to which said two resonators are exposed.

7. The measuring device according to claim 6, wherein said intrinsic difference in turning point between said first and second quartz resonators is obtained by employing different cut angles when forming said quartz resonators from a quartz crystal.

8. The measuring device according to claim 3, wherein said measuring means comprises beat generating means for generating a beat signal from the oscillation signals from said oscillation circuits and beat frequency measuring means for counting the frequency of said beat signal.

9. A pressure measuring device comprising:

first and second oscillation circuits including first and second quartz resonators, respectively, for measuring pressure based on the difference in oscillation frequency between said first and second oscillation circuits, said first and second quartz resonators being placed under different pressures from each other;

measuring means for producing a measured value corresponding to the difference in oscillation frequency between said two oscillation circuits, and temperature dependent resistors connected to at least one of said two oscillation circuits for modifying the temperature dependence of the oscillation frequency of said oscillation circuit including said temperature dependent resistors so that the temperature dependence of said difference in oscillation frequency between said two oscillation circuits is reduced.

10. The measuring device according to claim 9, wherein said temperature dependent resistors are a thermistor.

11. The measuring device according to claim 10, wherein another resistor having different temperature dependence from said temperature dependent resistors is connected to said temperature dependent resistors in parallel.

12. The measuring device according to claim 9, wherein said temperature dependent resistors are a monolithic resistor.

13. The measuring device according to claim 12, wherein another resistor having different temperature dependence from said temperature dependent resistors are connected to said temperature dependent resistors in parallel.

14. The measuring device according to claim 9, wherein said monolithic resistor is an FET channel resistor.

15. The measuring device according to claim 14, wherein another resistor having different temperature dependence from said temperature dependent resistors are connected to said temperature dependent resistors in parallel.

16. The measuring device according to claim 9, wherein said measuring means comprises beat generating means for generating a beat signal from the oscillation signals from said oscillation circuits and beat frequency measuring means for counting the frequency of said beat signal.

17. A pressure measuring device, comprising:

first and second oscillation circuits including first and second quartz resonators, respectively, for measuring pressure based on the difference in oscillation frequency between said first and second oscillation circuits, said first and second quartz resonators being placed under different pressures from each other;

measuring means for producing a measured value corresponding to the difference in oscillation frequency between said two oscillation circuits, temperature dependent resistors connected to at least one of said two oscillation circuits for modifying the temperature dependence of the oscillation frequency of said oscillation circuit including said temperature dependent resistors so that the temperature dependence of said difference in oscillation frequency between said two oscillation circuits is reduced, temperature measurement means for measuring the ambient temperature of said first and second quartz resonators, and temperature calibration means for calibrating said measured values with regard to said ambient temperature according to a given temperature calibration formula.

18. The measuring device according to claim 17, wherein said temperature calibration means performs calibration for said measured value according to a temperature calibration formula of quadratic or higher order.

19. The measuring device according to claim 17, wherein said measuring means comprises beat generating means for generating a beat signal from the oscillation signals from said oscillation circuits and beat frequency measuring means for counting the frequency of said beat signal.

20. The measuring device according to claim 19, wherein said beat frequency measuring means measures the cycles of said beat signal by detecting the state at a given phase of said beat signal and rechecking the state of said beat signal at a predetermined period of time set shorter than the period of said beat signal after said detection.

21. The measuring device according to claim 17, wherein said beat generating means detects and holds the state of the signal from one of said two oscillation circuits in synchronism with the signal from the other oscillation circuit and outputs said held state signal.

22. The measuring device according to claim 21, wherein said beat frequency measuring means measures the cycles of said beat signal by detecting the state at a given phase of said beat signal and rechecking the state of said beat signal in a given period of time set shorter than the period of said beat signal after said detection.

* * * * *